United States Patent
Zhang et al.

(10) Patent No.: US 10,576,421 B2
(45) Date of Patent: Mar. 3, 2020

(54) METHOD OF WATER PURIFICATION USING HYDROPHILIC AND COMPRESSIBLE AEROGEL AS DRAW AGENT IN FORWARD OSMOSIS

(71) Applicant: Dalian University of Technology, Dalian, Liaoning Province (CN)

(72) Inventors: Hanmin Zhang, Dalian (CN); Mingchuan Yu, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/069,613

(22) PCT Filed: Nov. 30, 2016

(86) PCT No.: PCT/CN2016/107814
§ 371 (c)(1),
(2) Date: Jul. 12, 2018

(87) PCT Pub. No.: WO2018/098644
PCT Pub. Date: Jun. 7, 2018

(65) Prior Publication Data
US 2019/0001271 A1    Jan. 3, 2019

(51) Int. Cl.
| | | |
|---|---|---|
| *C02F 1/00* | (2006.01) | |
| *C02F 1/18* | (2006.01) | |
| *C02F 1/44* | (2006.01) | |
| *B01D 61/00* | (2006.01) | |
| *B01J 20/24* | (2006.01) | |
| *B01J 20/28* | (2006.01) | |
| *B01J 20/30* | (2006.01) | |
| *B01J 20/20* | (2006.01) | |
| *C02F 1/28* | (2006.01) | |

(52) U.S. Cl.
CPC .......... *B01D 61/005* (2013.01); *B01J 20/20* (2013.01); *B01J 20/205* (2013.01); *B01J 20/24* (2013.01); *B01J 20/28047* (2013.01); *B01J 20/3085* (2013.01); *C02F 1/002* (2013.01); *C02F 1/283* (2013.01); *C02F 1/286* (2013.01); *C02F 1/445* (2013.01)

(58) Field of Classification Search
CPC ............ C08J 2205/022; C08J 2205/026; C08J 2300/14; C02F 1/445; C02F 1/288; C02F 1/002; C02F 1/283; C02F 1/286; C02F 1/28; C02F 1/281; C02F 1/285; C02F 1/44; C02F 2101/22; C02F 2305/08
See application file for complete search history.

(56) References Cited

FOREIGN PATENT DOCUMENTS

| | | |
|---|---|---|
| CN | 105536726 A | 5/2016 |
| CN | 105797685 A | 7/2016 |
| CN | 106587271 A | 4/2017 |
| KR | 20160117068 A | 10/2016 |
| WO | WO 2016161123 A1 | 10/2016 |

OTHER PUBLICATIONS

The machine translation of CN105536726.*
Hydrophilic and Compressible Aerogel: A Novel Draw Agent in Forward Osmosis, Yu et al., ACS Appl. Mater. Interfaces 2017, 9, 33948-33955.*
Liu, Haohuai, et al, "Preparation and Research of Graphene Oxide/Sodium Alginate Composite," New Chemical Materials, Jul. 31, 2016, vol. 44, No. 7, 3 pages.
Liu, Cuiyun et al, "Study on Preparation and Properties of pH Sensitive Sodium Alginate/Graphene Oxide Composite Hydrogel Balls," Journal of Functional Materials, Dec. 31, 2014, 5 pages.

* cited by examiner

*Primary Examiner* — Haidung D Nguyen
(74) *Attorney, Agent, or Firm* — Muncy, Geissler, Olds & Lowe, P.C.

(57) ABSTRACT

The present invention discloses a novel hydrophilic and compressible aerogel as draw agent for purification water in forward osmosis (FO), which belongs to environmental pollution control engineering technical field. The improved performances are obtained by optimizing regeneration process of drawing and producing water by using this aerogel as a draw agent in FO technology. Herein, the aerogel complete avoid the draw solution's reverse diffusion and maintain a higher water flux that compensates for its structure characteristics. Moreover, the regeneration of the draw agent and production water should be accomplished through human compression without a complicated physical and chemical method. Simultaneously, this draw agent presents other advantages of wide raw material sources, low cost, wild preparation process, low poison and good film compatibility. It is an innovation as FO technology in portable water purifying device, especially in areas of military and emergency.

2 Claims, No Drawings

METHOD OF WATER PURIFICATION USING HYDROPHILIC AND COMPRESSIBLE AEROGEL AS DRAW AGENT IN FORWARD OSMOSIS

TECHNICAL FIELD

The present invention relates to a hydrophilic and compressible aerogel as draw agent for purity water in forward osmosis (FO) process, which belongs to environmental pollution control engineering technical field and is particularly suitable as an innovational draw agent in portable water purifying device for the areas of military and emergency.

BACKGROUND

FO is a membrane separation process that relies solely on osmotic pressure, which means that water molecules spontaneously penetrate through the semipermeable membrane from the feed solution side (the high water chemistry potential) to draw solution side (the low water chemistry potential). It is an efficient route to obtain pure water for drinking from wastewater or seawater. Compared to the microfiltration membrane separation technologies, ultrafiltration, nanofiltration and reverse osmosis, there are many advantages in FO technology for treatment wastewater, including (i) high desalination capacity, (ii) low trend of membrane fouling, (iii) no additional driving force and (iv) low requirements on the feed water quality. Consequently, FO processes have been widely applied in the seawater desalination, complicated wastewater treatment, power generation, food processing, and pharmaceutical concentration.

Hydration bags developed by HTI Company are one of the FO's commercial applications, which are particularly widely used as relief devices in military and emergency fields. In hydration bags, an edible draw solution (e.g., a sugar or beverage powder) is packed in a sealed bag made of a semi-permeable FO membrane. When the bags are immersed in wastewater, the pure water diffuses into the bag due to the osmotic pressure difference and the diluted draw solution is used as drinking water. In this process, FO hydration bags provide pure water for drinking directly without external power and are widely applied in wilderness survival and military fields. But hydration bags, typically using glucose, fructose or concentrated fruit juice as the draw agents, have some defects, such as the product is not pure water, the sweet water are not appropriate for everyone (e.g. diabetics) and the draw agent is disposable, to restrict its applications.

Although the FO technology is carried out extensively, the drawbacks, such as high reverse salt flux and high regeneration cost, still restrict its application. In previous researches, many materials, such as inorganic salts, natural macromolecules, synthetic macromolecules, magnetic nanoparticles, hydrophilic carbon quantum dots and so on, are developed successively. However, these draw solutions with the above shortcomings can't fully meet the FO technology's requirements. Recently, hydrogels, as an emerging draw agent, can completely avoid the reverse diffusion, attributing to the structure of three dimensional (3D) networks in polymer chains. Nevertheless, the water flux (driving force) and water recovery rate of hydrogels are much low owing to large volumes of water entrapping into the 3D networks structure and high water retention capacity.

Aerogel, as a kind of functional material with high porosity, low density and large specific surface area, has diverse physical and chemical properties according to its composition. Gao et al have directly synthesized the ultra-flyweight aerogel through physical blending, freeze-drying and reduction reaction with two-dimensional graphene oxide and one-dimensional carbon nanotube. It was called "super sponge" because it still kept its original scale and morphology after the fatigue test of 1000 cycles and maintained a better elasticity even at $-196°$ C. and $300°$ C.

In this invention, a hydrophilic and compressible SA-GO aerogel has been synthesized and used as a novel kind of draw agent in FO process with advantages of completely avoiding the reverse diffusion and the process of water production and aerogels regeneration should be rapidly and cost-effectively accomplished with low-strength mechanical compression. The SA-GO aerogels should be a potential material for hydration bags to fast and repeatable product fresh water from saline water or wastewater in military and emergency response fields.

SUMMARY

The present invention aims to provide a hydrophilic and compressible aerogel as draw agent to purify water in FO process which not only should completely avoid the reverse diffusion and maintain higher water flux caused by its solid structure and higher hydrophility, but also rapidly and cost-effectively purify water and regenerate itself because of its compressible under low force.

The present invention has the following technical solutions:

A draw agent of hydrophilic and compressible aerogels for purification water in FO is synthesized by:

Step 1: Obtain a uniform mixed solution of SA and GO under sonication treatment for a period time, wherein, the weight ratio of SA:GO is 100:1~8:1, GO concentration is 0.2~2.5 mg/mL.

Step 2: add $CaCl_2$ aqueous solution into the mixed solution in Step 1 and stand for 24~48 h at room temperature. The molar ratio of $CaCl_2$:sugar units in SA is 3:1~1:1. Put the synthesized hydrogel into deionized water and stand at room temperature. Replace the deionized water every 3 h until the solution conductivity is no more increasing (to prove that unreacted raw materials and inorganic salts have been basically removed).

Step 3: Pre-freeze the hydrogel in Step 2 at $-25°$ C.~$-15°$ C. for 2~4 h, and then freeze-dry it at $-60°$~$-90°$ C. for 24~48 h.

The prepared aerogels as draw agents replace of saccharides in a hydration bag (a portable FO device). This hydration bag should produce pure water from wastewater through FO membrane and aerogel draw agents. Then, the purified water is released from the hydration bag through human compressing for drinking.

The present invention has the beneficial effects on FO process, which completely avoiding the reverse diffusion and maintaining higher water flux simultaneously simplifying the process of pure water and self-regeneration, by forming and applying hydrophilic and compressible aerogels as draw agents. This novel draw agents, the hydrophilic and compressible aerogels, are synthesized through gel, displacement and lyophilization (freeze drying) process with SA and GO as precursors. Herein, GO, as a vital intermediate in preparing of graphene, presents a superior hydrophilicity and modifiability over graphene caused by abundant oxygen-containing functional group existing. At the same time, it also provides a large number of reaction sites for amine, hydroxyl and carboxyl to cross-link together. And SA, as a natural macromolecule, exhibits a strong hydrophilicity and easy to form gel. Considering these performances, the two precursors interact with each other to form a more stability and hydrophilicity aerogel.

DETAILED DESCRIPTION

Specific embodiments of the present invention are described below in detail in combination with the technical solution and accompanying drawings.

Embodiment

1. Seawater Desalination

The SA-GO aerogels are synthesized as followed: 2 wt % SA (200 mL) and 50 mg GO are mixed through sonication treatment for 2 h. Then 29 mL $CaCl_2$ (0.24 mol/L) aqueous solution is added into the mixture. Then the uniform solution is poured into a mould and stand for 24 h to form a hydrogel. The as-synthesized hydrogel is impregnated into deionized water at room temperature and the deionized water is replaced every 3 h until the conductivity in solution is no more increasing. The hydrogel is pre-freezed at $-25°$ C. for 2 h then is freezed at $-90°$ C. for 48 h to form an aerogel.

The as-formed aerogel (6 g) is used as draw agent in a hydration bag for seawater desalination. After saturated, the pure water can be obtained through compressing the hydration bag with a slight force.

2. Rainwater Regeneration

The SA-GO aerogels are synthesized as followed: 2 wt % SA (400 mL) and 100 mg GO are mixed through sonication treatment for 4 h. Then 58 mL $CaCl_2$, (0.24 mol/L) aqueous solution is added into the mixture. Then the uniform solution is poured into a mould and stand for 48 h to form a hydrogel. The as-synthesized hydrogel is impregnated into deionized water at room temperature and the deionized water is replaced every 3 h until the conductivity in solution is no more increasing. The hydrogel is pre-freezed at $-25°$ C. for 4 h, then is freezed at $-90°$ C. for 48 h to form an aerogel.

The as-formed aerogel (12 g) is used as draw agent in hydration bag for rainwater regeneration. After saturated, the pure water can be obtained through compressing the hydration bag with a slight force. Repeat the above steps, the hydration bag should be multiple used.

3. Sewage Purification

The SA-GO aerogels are synthesized as followed: 2 wt % SA (2000 mL) and 500 mg GO are mixed through sonication treatment for 4 h. Then 290 mL $CaCl_2$ (0.24 mol/L) aqueous solution is added into the mixture. Then the uniform solution is poured into a mould and stand for 48 h to form a hydrogel. The as-synthesized hydrogel is impregnated into deionized water at room temperature and the deionized water is replaced every 3 h until the conductivity in solution is no more increasing. The hydrogel is pre-freezed at $-25°$ C. for 4 h, then is freezed at $-90°$ C. for 48 h to form an aerogel.

The as-formed aerogel is used as draw agent in FO reactor for sewage purification. In a two-chamber FO reactor, one is feed solution chamber (sewage), and the other is draw solution chamber (aerogel draw agent). A piston plate is installed close to aerogel. The sewage accesses into the feed solution chamber. After adsorption saturated, the pure water is produced through repeated compressing the aerogel by the piston plate. An effective and stable drawing-releasing water process can maintain at high production water rate even repeated 1000 times.

We claim:

1. A method of water purification using hydrophilic and compressible aerogels as draw agent in forward osmosis, comprising:
    step 1: obtaining a uniform mixed solution of sodium alginate SA and graphene oxide solid GO under sonication treatment after a period of time, wherein, the weight ratio of SA:GO is 100:1~8:1, GO concentration is 0.2~2.5 mg/mL;
    step 2: obtaining hydrogel by adding $CaCl_2$ aqueous solution into the mixed solution in step 1 and standing for 24~48 h at room temperature; the molar ratio of $CaCl_2$: sugar units in SA is 3:1~1:1; putting the hydrogel into deionized water and standing at room temperature; replacing the deionized water every 3 h until the solution conductivity is no more increasing;
    step 3: pre-freezing the hydrogel in step 2 at $-25$~$-15°$ C. for 2~4 h, and then freeze-drying it at $-60$~$-90°$ C. for 24~48 h; and
    step 4: purifying water from wastewater or brackish water in FO process using the obtained aerogel in step 3 as draw agent.

2. The method of water purification using hydrophilic and compressible aerogels as draw agent in forward osmosis according to claim 1, wherein the as-prepared aerogels as a portable forward osmosis device and draw agent replace saccharides in a hydration bag.

* * * * *